(12) United States Patent
Cheraghi et al.

(10) Patent No.: US 10,862,570 B1
(45) Date of Patent: Dec. 8, 2020

(54) METHODS AND APPARATUS TO FACILITATE ADAPTIVE PRECODER UPDATING FOR CHANNEL STATE FEEDBACK

(71) Applicant: QUALCOMM Incorporated, San Diego, CA (US)

(72) Inventors: Parisa Cheraghi, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/418,313

(22) Filed: May 21, 2019

(51) Int. Cl.
*H04B 7/08* (2006.01)
*H04B 7/06* (2006.01)

(52) U.S. Cl.
CPC ......... *H04B 7/0862* (2013.01); *H04B 7/0626* (2013.01); *H04B 7/0632* (2013.01); *H04B 7/0639* (2013.01)

(58) Field of Classification Search
CPC .. H04B 7/0862; H04B 7/0632; H04B 7/0626; H04B 7/0639
See application file for complete search history.

(56) References Cited

U.S. PATENT DOCUMENTS 10,200,103 B2 * 2/2019 Rahman ............... H04B 7/0634
2018/0262250 A1 * 9/2018 Kim .................... H04B 17/309

* cited by examiner

*Primary Examiner* — Vineeta S Panwalkar
(74) *Attorney, Agent, or Firm* — Qualcomm Incorporated

(57) ABSTRACT

Apparatus, methods, and computer-readable media for facilitating adaptive precoder updating for channel state feedback are disclosed herein. An example method of wireless communication at a UE includes selecting a second wideband component $W_1$ of a second PMI, the second PMI including the second wideband component $W_1$ and a second subband component $W_2$, and the selecting of the second wideband component $W_1$ being based at least on a determining of whether to reuse for the second wideband component $W_1$ a first wideband component $W_1$ of a first PMI previously determined based on received first CSI-RS, the first PMI including a first wideband component $W_1$ and a first subband component $W_2$. The example method also includes determining the second PMI based on a received second CSI-RS, the second wideband component $W_1$, and the second subband component $W_2$. The example method also includes reporting the determined second PMI to a base station.

30 Claims, 8 Drawing Sheets

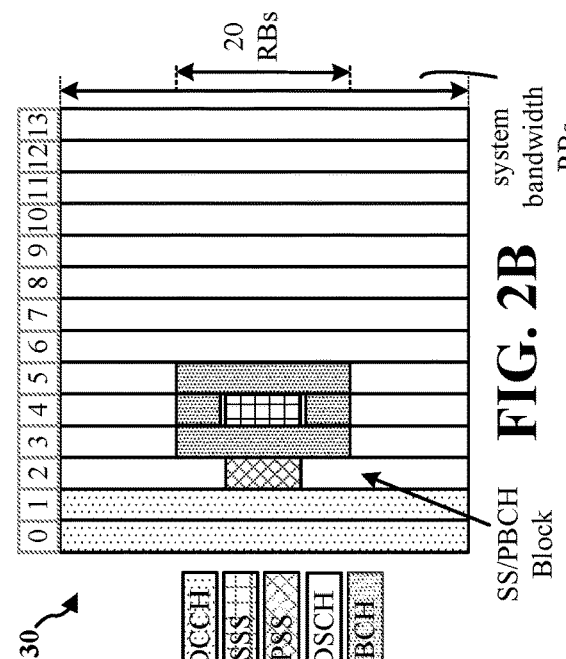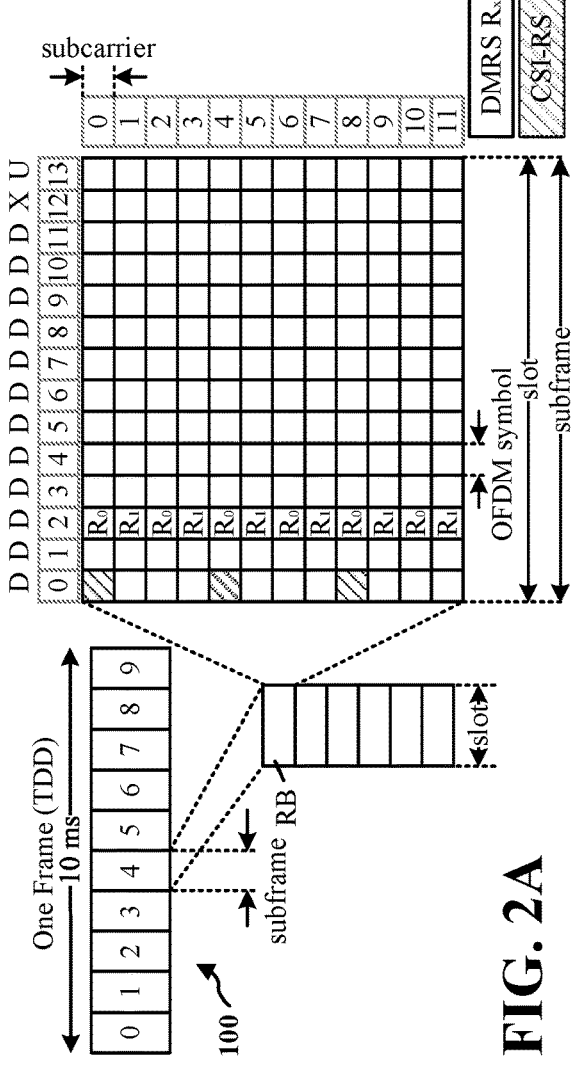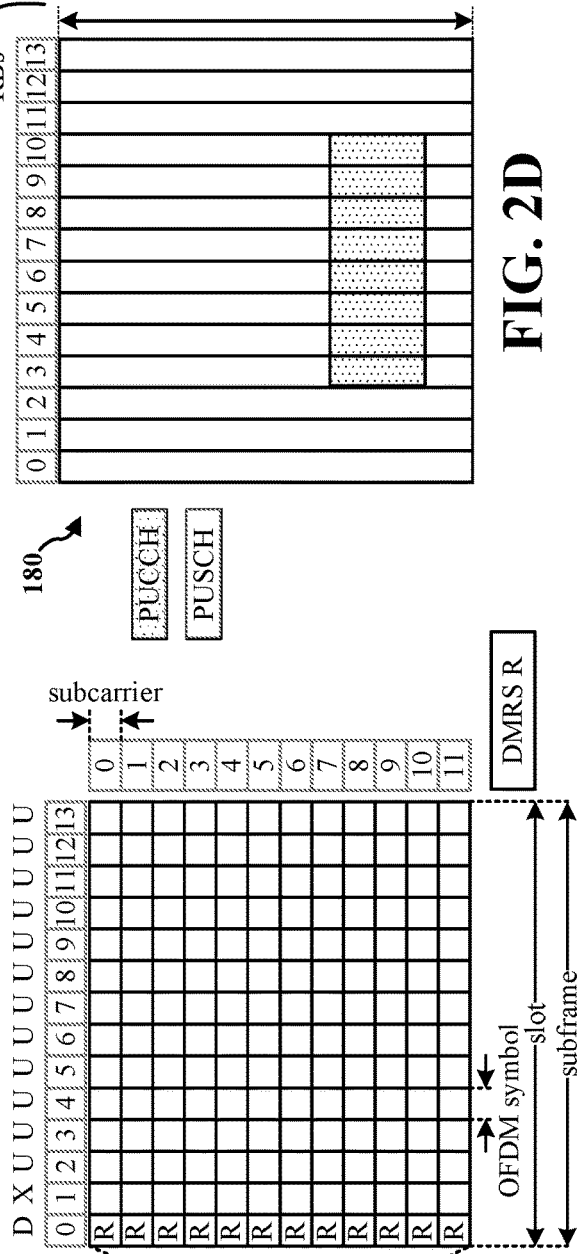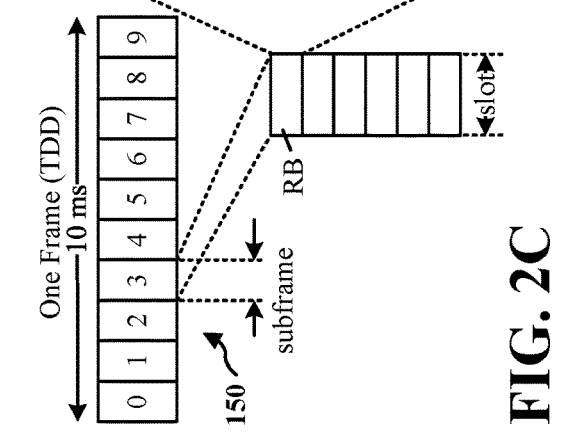

METHODS AND APPARATUS TO FACILITATE ADAPTIVE PRECODER UPDATING FOR CHANNEL STATE FEEDBACK

BACKGROUND

Technical Field

The present disclosure relates generally to communication systems, and more particularly, to channel state feedback procedures.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G/NR is part of a continuous mobile broadband evolution promulgated by Third Generation Partnership Project (3GPP) to meet new requirements associated with latency, reliability, security, scalability (e.g., with Internet of Things (IoT)), and other requirements. 5G/NR includes services associated with enhanced mobile broadband (eMBB), massive machine type communications (mMTC), and ultra reliable low latency communications (URLLC). Some aspects of 5G/NR may be based on the 4G Long Term Evolution (LTE) standard. There exists a need for further improvements in 5G/NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A channel state feedback procedure may include a first device (e.g., a user equipment (UE)) receiving a channel state information reference signal (CSI-RS) from a second device (e.g., a base station) and transmitting a CSI report to the second device including, for example, channel conditions for the reference signals received at the first device. In some examples, determining the CSI report may include selecting a precoding matrix indicator (PMI). In some examples, a majority of the CSI report determination process may be utilized by the PMI selection. However, accurate PMI selection is beneficial, especially as the quantity of antennas in a system increases. PMI selection may include selecting a wideband component $W_1$ and a subband component $W_2$.

Example techniques disclosed herein facilitate adaptive precoder updating for channel state feedback. For example, techniques disclosed herein facilitate dynamically determining whether to reuse a first wideband component $W_1$ of a first PMI for a second wideband component $W_1$, whether to select the second wideband component $W_1$ from a wideband component codebook, and/or whether to select the second wideband component $W_1$ from a subset of the wideband component codebook. In some examples, the determining of whether to reuse the first wideband component $W_1$ for the second wideband component $W_1$ may be based on one or more conditions associated with the first wideband component $W_1$, a first CSI-RS associated with the first wideband component $W_1$, the first PMI, a second CSI-RS, and/or conditions associated with the UE. By dynamically determining whether to reuse the first wideband component $W_1$, techniques disclosed herein may increase power/cycle savings without introducing performance degradation.

In an aspect of the disclosure, a method, a computer-readable medium, and an apparatus are provided. An example apparatus for wireless communication selects, at a UE, a second wideband component $W_1$ of a second PMI, the second PMI includes the second wideband component $W_1$ and a second subband component $W_2$. In some examples, the apparatus selects the second wideband component $W_1$ based at least on a determining of whether to reuse for the second wideband component $W_1$ a first wideband component $W_1$ of a first PMI previously determined based on a received first CSI-RS, and the first PMI includes a first wideband component $W_1$ and a first subband component $W_2$. The example apparatus also determines the second PMI based on a received second CSI-RS, the second wideband component $W_1$, and the second subband component $W_2$, and reports the determined second PMI to a base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
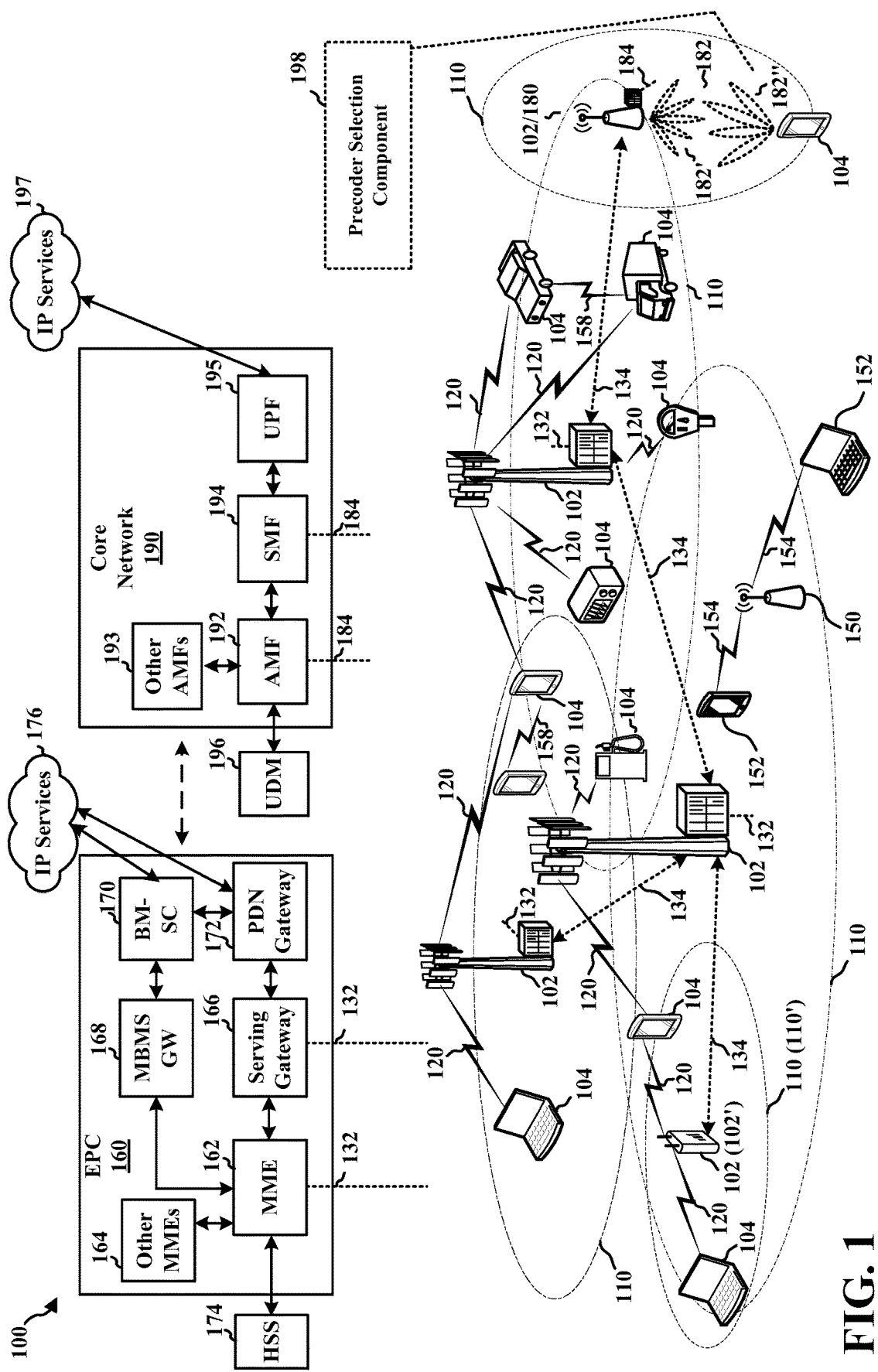
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN) may interface with the EPC 160 through backhaul links 132 (e.g., 51 interface). The base stations 102 configured for 5G/NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication via adaptive precoder updating for channel state feedback. As an example, in FIG. 1, the UE 104 may include a precoder selection component 198 configured to select a second wideband component $W_1$ of a second PMI, the second PMI to include the second wideband component $W_1$ and a second subband component $W_2$. The precoder selection component 192 may also be configured to select the second wideband component $W_1$ based at least on a determining of whether to reuse for the second wideband component $W_1$ a first wideband component $W_1$ of a first PMI previously determined based on a received first CSI-RS, and the first PMI to include a first wideband component $W_1$ and a first subband component $W_2$. The precoder selection component 192 may also be configured to determine the second PMI based on a received second CSI-RS, the second wideband component $W_1$, and the second subband component $W_2$, and to report the determined second PMI to a base station.

Although the following description may provide examples based on NR channel state feedback, it should be appreciated that the concepts described herein may be applicable to other communication technologies. For example, the concepts described herein may be applicable to LTE, LTE-A, CDMA, GSM, and/or other wireless technologies (or RATs) in which one or more reference signals and/or reports may be exchanged.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu \cdot 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A to 2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
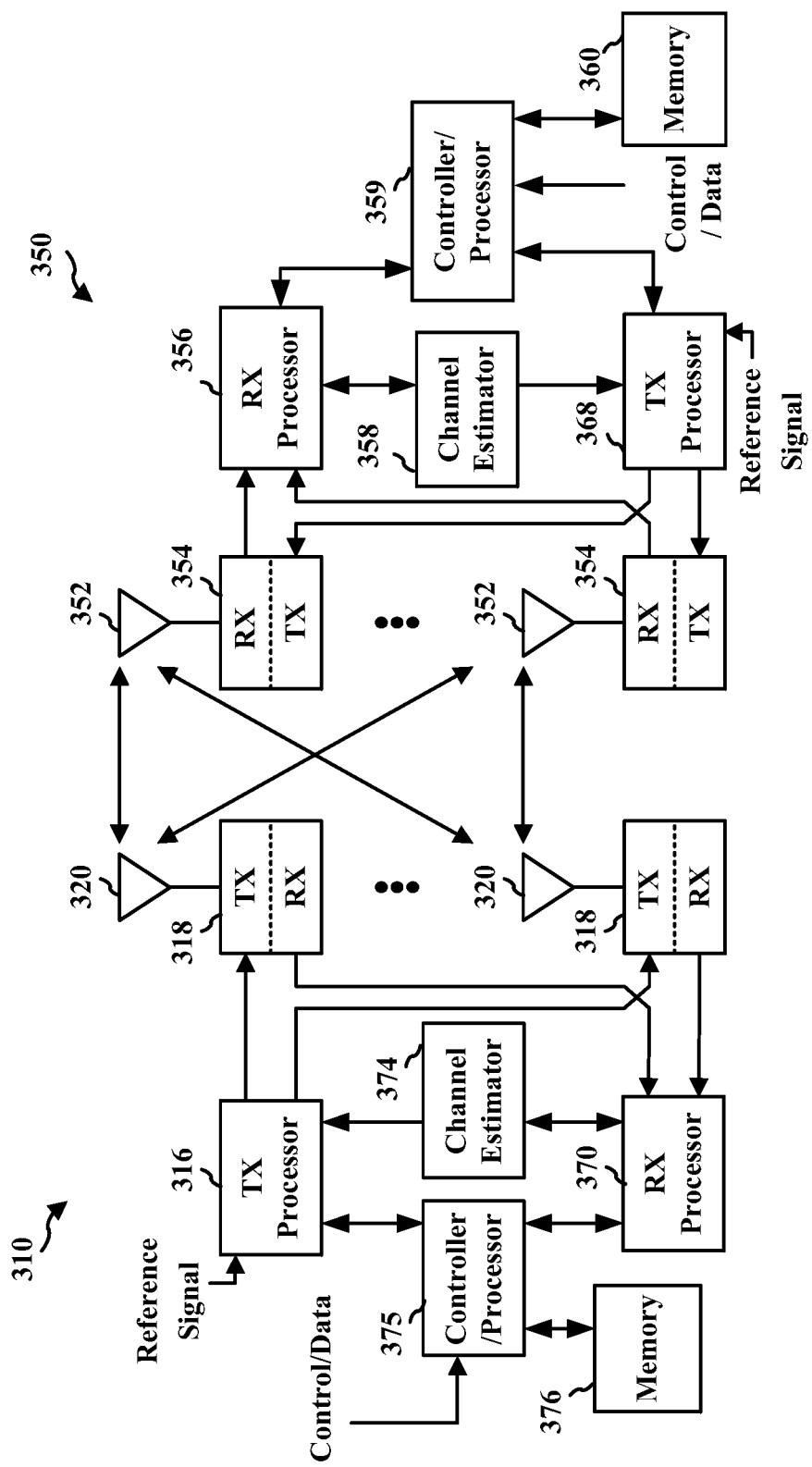
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and/or the controller/processor 359 of the UE 350 may be configured to perform aspects in connection with the precoder selection component 198 of FIG. 1.

In response to receiving a CSI-RS, a UE may measure various radio channel conditions and report the measurements to a base station (e.g., may perform the channel state feedback procedure). For example, after receiving the CSI-RS, the UE may generate a CSI report including one or more components, such as channel quality information (CQI), a layer indicator (LI), a rank indicator (RI), and a PMI (sometimes referred to as a "precoder").

In some examples, the PMI may be selected from a codebook (or dictionary). In some examples, the codebook may be predetermined (e.g., as provided by a standard). In NR, a dual stage codebook may be used for determining the precoder. For example, a UE may use Equation 1 (below) to determine a precoder.

$$W = W_1 W_2 \quad \text{(Equation 1)}$$

In Equation 1, (W) represents the precoder, ($W_1$) represents a wideband component, and ($W_2$) represents a subband component. The wideband component $W_1$ represents the wideband or long-term properties of the channel. The subband component $W_2$ represents the subband or short-term properties of the channel. For example, the subband component $W_2$ may useful for determining beam selection and/or co-phasing of polarization. In some examples, the subband component $W_2$ may correspond to a portion of a frequency band, while the wideband component $W_1$ may correspond to the frequency band.

In some examples, the wideband component $W_1$ may be represented using Equation 2 (below)

$$W_1 = \begin{bmatrix} B & 0 \\ 0 & B \end{bmatrix} \quad \text{(Equation 2)}$$

In Equation 2, the wideband component $W_1$ may be represented via a block diagonal matrix in which B represents a set of vectors corresponding to oversampled 2D DFT beams.

Using the wideband component $W_1$ and the subband component $W_2$, the UE may then determine the PMI. In some examples, the precoding matrix for Type 1 may be represented using Equation 3 (below).

$$W = \frac{1}{\sqrt{2vN_1N_2}} \begin{bmatrix} w_{0,0} & w_{0,1} & \ldots & w_{0,v-1} \\ w_{1,0} & w_{1,1} & \ldots & w_{1,v-1} \end{bmatrix} \quad \text{(Equation 3)}$$

In Equation 3, (v) denotes the layers, ($N_1$) represents the number of CSI-RS ports in the horizontal dimension, and ($N_2$) represents the number of CSI-RS ports in the vertical dimension.

While PMI selection may include finding the corresponding matrix (or matrices) in the codebook, performing the PMI selection is a complicated process, especially for the UE. For example, as the number of antennas increases, the complexity of finding the precoder increases because the size of the codebook also increases. However, accurate PMI selection is beneficial, especially as the number of antennas increases at the base station, as the throughput delta between selecting the optimal precoder verses selecting an incorrect precoder may be substantial.

In some examples, the majority of the complexity in determining the CSI report may be driven by finding the correct precoder (e.g., up at 75% of the complexity). As described above, the wideband component $W_1$ corresponds to the long-term or wideband properties of the frequency band. Accordingly, the main complexity of performing the precoder selection may be due to the selection of the wideband component $W_1$ due to, for example, the relatively large size of the corresponding codebook.

In some examples, transmissions of CSI-RS may have relatively high periodicity (e.g., once every 4 slots or every 0.4 units at 120 kHz sub-carrier spacing (SCS)). Performing PMI selection, and, in particular, selection of the wideband component $W_1$, each time a CSI-RS is received, may lead to high power/cycle consumption. However, in some instances, updating the wideband component $W_1$ may not provide benefits that substantially outweigh the costs of performing the wideband component $W_1$ selection. For example, in relatively low mobility instances, where channel change is relatively insignificant and the CSI-RS uses a same identifier as a previous CSI-RS (e.g., to confirm that this is not a first CSI-RS), the UE may be able to update the wideband component $W_1$ less frequently than the CSI-RS periodicity.

Example techniques disclosed herein facilitate opportunistically determining when to update the wideband component $W_1$ and/or to reuse a previous wideband component $W_1$ when determining a PMI. In some examples, the UE may measure properties associated with the CSI-RS, the previous PMI, and/or the UE when selecting the wideband component $W_1$. For example, the UE may measure and/or determine properties such as channel condition, mobility, Rx/Tx beam configuration, TCI state, and/or quality of the determination of the last PMI update when selecting the current wideband component $W_1$. In certain such examples, the UE may determine whether one or more of the properties satisfy corresponding thresholds when determining the current wideband component $W_1$. For example, if based on measurements, the UE determines that the UE has relatively low mobility, the channel condition is relatively good, the quality of the determination of the last PMI update was relatively good, and the current CSI-RS has properties that are the same as the previous CSI-RS (e.g., the same identifier, the same beam configuration, and/or the same TCI state), then the UE may determine to skip updating the wideband component $W_1$ and to reuse the previous wideband component $W_1$. However, if the UE determines that one or more of the properties are not satisfactory, then the UE may determine to update the wideband component $W_1$.

In some examples, the UE may apply tiers of thresholding when determining whether the one or more properties are satisfactory and select the wideband component $W_1$ based on the thresholding. For example, the UE may first determine whether the properties of the current CSI-RS and the previous CSI-RS are the same (e.g., the same identifier, the same beam configuration, and/or the same TCI state) and whether the quality of the determination of the last PMI update satisfies a threshold quality. In certain such examples, if the UE determines that the properties of the current CSI-RS and the previous CSI-RS are not the same (e.g., one or more of the identifier, the beam configuration, and/or the TCI state is not the same) and/or the quality of the determination of the last PMI update does not satisfy the threshold quality, then the UE may determine to update the wideband component $W_1$.

However, if the UE determines that the properties are the same and the quality of the determination of the last PMI update satisfies the threshold quality, then the UE may compare the mobility of the UE and/or the channel condition (e.g., of reference signals received at the UE) to one or more respective thresholds when selecting the current wideband component $W_1$. For example, the UE may compare the mobility and the channel condition to a first set of thresholds. The UE may then determine to skip updating the current wideband component $W_1$ (e.g., reuse the previous wideband component $W_1$) when the mobility and the channel condition satisfy the first set of thresholds. In some examples, in response to determining that the first set of thresholds is not satisfied (e.g., the mobility does not satisfy the corresponding first threshold and/or the channel condition does not satisfy the corresponding first threshold), the UE may compare the mobility and the channel condition to a second set of thresholds. In certain such examples, if the UE determines that the second set of thresholds are satisfied, the UE may select the current wideband component $W_1$ from a subset of the codebook used to select the wideband component $W_1$. And, if the UE determines that the second set of thresholds are not satisfied (e.g., the mobility does not satisfy the corresponding second threshold and/or the channel condition does not satisfy the corresponding second threshold), then the UE may determine to select the current wideband component $W_1$ from the full codebook.

It should be appreciated that while the above example described two sets of thresholds, in other examples, any suitable quantity of thresholds may be used.

By utilizing the techniques disclosed herein, the UE may dynamically determine when to update the wideband component $W_1$ and/or to reuse the previous wideband component $W_1$. By dynamically determining when to update, the techniques disclosed herein facilitate updating the wideband component $W_1$ less frequently than the CSI-RS periodicity, which may enable conserving power/cycle consumption.

Furthermore, in some examples, two different precoders may alternate in being characterized as being the "best" precoder, while offering the same benefit (or relatively same benefits) as the other. In certain such examples, if the UE were to select the precoder each time the CSI-RS is received, the UE may "ping-pong" between the two precoders. However, by utilizing the techniques disclosed herein, if the UE determines that properties associated with the current CSI-RS and the previous CSI-RS are relatively the same, then the UE can forego updating the wideband component $W_1$ (e.g., use the previous wideband component $W_1$) and avoid "ping-ponging" between two precoders, resulting in a relatively more stable precoder selection.

Figure 4:
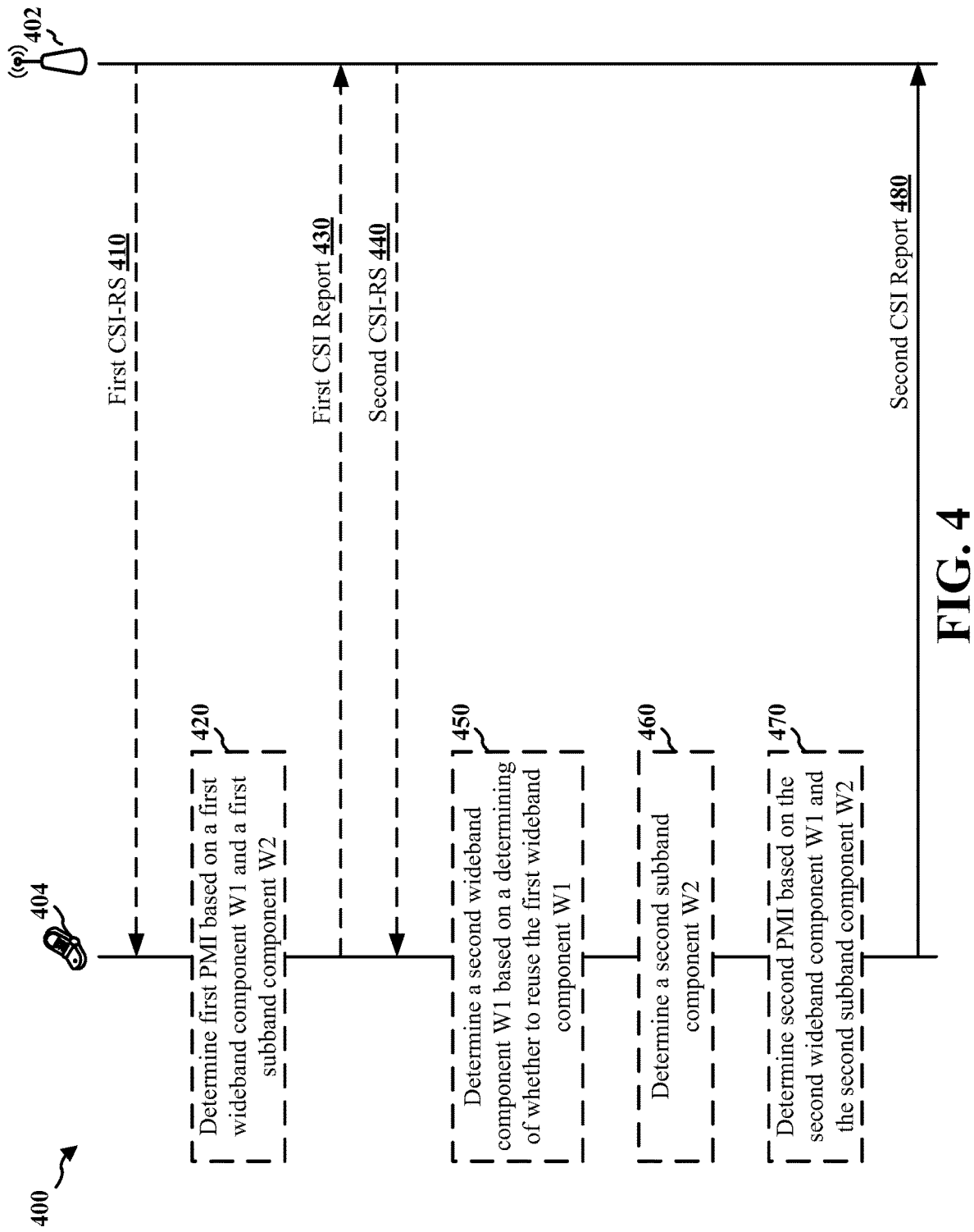
FIG. 4 is an example communication flow between a base station and a UE, in accordance with the teachings disclosed herein.

FIG. 4 illustrates an example of wireless communication 400 between a base station 402 and a UE 404, as presented herein. One or more aspects of the base station 402 may be implemented by the base station 102/180 of FIG. 1 and/or the base station 310 of FIG. 3. One or more aspects of the UE 404 may be implemented by the UE 104 of FIG. 1 and/or the UE 350 of FIG. 3.

It should be appreciated that while the wireless communication 400 includes one base station 402 in communication with one UE 404, in additional or alternative examples, the base station 402 may be in communication with any suitable quantity of UEs 404 and/or base stations 402, and/or the UE 404 may be in communication with any suitable quantity of base stations 402 and/or UEs 404. Furthermore, while the wireless communication 400 includes a channel state feedback procedure between the base station 402 and the UE 404, it should be appreciated that in other examples, the wireless communication 400 may include additional or alternative feedback procedures.

In the illustrated example, the UE 404 may receive a first CSI-RS 410 from the base station 402. In some examples, the UE 404 may measure various radio channel conditions and report the measurements to the base station 402 in response to receiving the first CSI-RS 410 (e.g., may perform the channel state feedback procedure). For example, after receiving the first CSI-RS 410, the UE 404 may determine, at 420, a first PMI based on a first wideband component $W_1$ and a first subband component $W_2$. In some examples, the UE 404 may select the first wideband component $W_1$ from a wideband component codebook. In some examples, the UE 404 may utilize Equation 2 (above) to determine the first wideband component $W_1$. The UE 404 may then generate and transmit a first CSI report 430 including, for example, the first PMI, channel quality information (CQI), and/or a rank indicator (RI).

The UE 404 may then receive a second CSI-RS 440 from the base station 402. The UE 404 may then determine a second PMI in response to the second CSI-RS 440. To determine the second PMI, the UE 404 may determine, at 450, a second wideband component $W_1$. In the illustrated example of FIG. 4, the UE 404 may determine the second wideband component $W_1$ based on a determining of whether to reuse the first wideband component $W_1$ from the first PMI for the second wideband component $W_1$.

For example, the UE 404 may determine whether to reuse the first wideband component $W_1$ from the first PMI or to determine the second wideband component $W_1$ independently of the first wideband component $W_1$ (e.g., select a new wideband component $W_1$ from a wideband component codebook or dictionary). In some examples, the UE 404 may determine, at 450, the second wideband component $W_1$ from a subset of the wideband component codebook. In some examples, the UE 404 may determine, at 450, the second wideband component $W_1$ based on properties associated with the first CSI-RS 410, the second CSI-RS 440, the first wideband component $W_1$, and/or the UE 404.

The UE 404 may then determine, at 460, a second subband component $W_2$. In some examples, the UE 404 may determine the second subband component $W_2$ based on the second CSI-RS 440 and the second wideband component $W_1$.

After determining the second wideband component $W_1$ and the second subband component $W_2$, the UE 404 may determine, at 470, a second PMI based on the second wideband component $W_1$ and the second subband component $W_2$. For example, the UE 404 may utilize Equation 3 (above) to determine the second PMI. The UE 404 may then generate and transmit a second CSI report 480 including the second PMI to the base station 402.

As described above, in some examples, the determining, at 450, of the second wideband component $W_1$ may include the UE 404 determining whether to update the wideband component $W_1$ (e.g., select a new wideband component $W_1$) or to reuse a previous wideband component $W_1$ (e.g., the first wideband component $W_1$). In some examples, when updating the wideband component $W_1$ for the second wideband component $W_1$, the UE 404 may use the full codebook for selecting the second wideband component $W_1$, while in other examples, the UE 404 may use a subset of the codebook for selecting the second wideband component $W_1$. As described above, the UE 404 may compare one or more properties relating to the first CSI-RS 410, the second CSI-RS 440, the UE, and/or the first PMI when determining whether to update the wideband component $W_1$ for the second wideband component $W_1$ or to reuse the previous wideband component $W_1$ (e.g., the first wideband component $W_1$).

In some examples, when determining, at 450, the second wideband component $W_1$, the UE 404 may compare properties of the current CSI-RS (e.g., the second CSI-RS 440) to properties of a previous CSI-RS (e.g., the first CSI-RS 410). For example, in some examples, the UE 404 may compare an identifier (ID) of the current CSI-RS 440 to an identifier of the previous CSI-RS 410. By comparing the identifier of the current CSI-RS 440 to the identifier of the previous CSI-RS 410, the UE 404 may be able to confirm that a previous CSI-RS has been received and that a previous wideband component $W_1$ has been selected (e.g., confirm that there is a previous wideband component $W_1$ to reuse for the second wideband component $W_1$). In some examples, the UE 404 may compare the TCI state of the current CSI-RS 440 to the TCI state of the previous CSI-RS 410. In some examples, the UE 404 may compare the beam configuration of the current CSI-RS 440 to the beam configuration of the previous CSI-RS 410. In some examples, if the UE 404 determines that one or more properties between the current CSI-RS 440 and the previous CSI-RS 410 do not match, then the UE 404 may determine to update the wideband component $W_1$. In certain such examples, if the UE 404 determines that the properties between the current CSI-RS 440 and the previous CSI-RS 410 do match, then the UE 404 may determine to reuse the previous wideband component $W_1$ (e.g., the first wideband component $W_1$).

In some examples, when determining, at 450, the second wideband component $W_1$, the UE 404 may compare a quality of the determination of the last PMI update to a threshold quality. For example, the UE 404 may determine the quality of the determination of the first PMI update transmitted in the first CSI report 430 based the quantity of slots used when the determination of the first PMI was made. For example, in NR, there are uplink slots, downlink slots, and flexible slots that may be used, for example, when switching transmission directions (e.g., from a downlink transmission to an uplink transmission or from an uplink transmission to a downlink transmission). In certain such examples, if a flexible slot is used when determining the PMI, then the quality of the determination may not be relatively good. Thus, in certain examples, if the quantity of slots is less than a threshold quantity, the accuracy of the PMI selection may be reduced. Accordingly, if the UE 404 determines that the quality of the determination of the last PMI update (e.g., the first PMI of the illustrated example of FIG. 4) does not satisfy the threshold quality, then the UE 404 may determine to update the wideband component $W_1$ for the determining of the second wideband component $W_1$. In certain such examples, if the UE 404 determines that the quality of the determination of the last PMI update (e.g., the first PMI of the illustrated example of FIG. 4) does satisfy the threshold quality, then the UE 404 may determine to reuse the previous wideband component $W_1$ (e.g., the first wideband component $W_1$).

In some examples, when determining, at 450, the second wideband component $W_1$, the UE 404 may compare a quantity of reuses of the previous wideband component $W_1$ to a threshold number of consecutive slots (e.g., twenty slots). For example, while reusing a previous wideband component $W_1$ may be beneficial, it may also be beneficial to update the wideband component $W_1$ at certain intervals. In some examples, when determining whether to update the wideband component $W_1$ to use for the second wideband component $W_1$ or to reuse the previous wideband component $W_1$ (e.g., the first wideband component $W_1$), the UE 404 may compare the number of times that the previous wideband component $W_1$ (e.g., the first wideband component $W_1$) has been reused to a threshold number of consecutive slots. In certain such examples, the UE 404 may determine to reuse the previous wideband component $W_1$ when the number of times of reuse is less than (or equal to) the threshold number of consecutive slots, and the UE 404 may determine to update the wideband component $W_1$ for the determining of the second wideband component $W_1$ when the number of times of reuse is greater than the threshold number of consecutive slots.

In some examples, the quantity of the threshold number of consecutive slots may vary based on, for example, the frequency band. For example, for millimeter wave (mm-Wave or mmW) frequency bands, the UE 404 may use a first threshold number (e.g., 40 slots), while for subband frequency bands, the UE 404 may use a second threshold number (e.g., 20 slots).

In some examples, when determining, at 450, the second wideband component $W_1$, the UE 404 may compare a mobility of the UE to a mobility threshold and/or a channel condition to a channel condition threshold. For example, when the UE 404 is a low mobility device and has relatively good channel conditions, the UE 404 may determine to skip updating the wideband component $W_1$ and to reuse the previous wideband component $W_1$ (e.g., the first wideband component $W_1$). In certain such examples, whether the UE 404 is a low mobility device may be based on a comparison of mobility-related measurements to the mobility threshold. Similarly, whether the UE 404 has relatively good channel conditions may be based on a comparison of channel condition measurements to the channel condition threshold. As used herein, the channel condition refers to the channel condition of reference signals received at the UE. In some examples, the mobility-related measurements and/or the channel condition measurements (e.g., the channel condition of reference signals received at the UE) may include one or more of a Doppler shift, a Doppler spread, an average delay, a delay spread, and/or a spatial Rx parameter.

In some examples, the UE 404 may determine to reuse the previous wideband component $W_1$ (e.g., the first wideband component $W_1$) when the mobility of the UE (based on the mobility-related measurements) satisfies the mobility threshold and the channel condition (based on the channel condition measurements) satisfies the channel condition threshold, and the UE 404 may determine to update the wideband component $W_1$ for the determining of the second wideband component $W_1$ when the mobility of the UE does not satisfy the mobility threshold and/or the channel condition does not satisfy the channel condition threshold.

In some examples, the mobility of the UE and/or the channel conditions may be divided into different tiers. For example, based on different mobility-related measurements and/or channel condition measurements, the UE 404 may be classified as a high-mobility device, a medium-mobility device, or a low-mobility device. In certain such examples, the UE 404 may apply different thresholds for determining the mobility classification of the device. For example, the UE 404 may determine that the UE is (1) a low-mobility device when the mobility of the UE is less than a first mobility threshold and the channel condition is greater than a first channel condition threshold, (2) a medium-mobility device when the mobility of the UE is greater than or equal to the first mobility threshold and less than a second mobility threshold and the channel condition is less than or equal to the first channel condition threshold and greater than a second channel condition threshold, or (3) a high-mobility device when the mobility of the UE greater than or equal to the second mobility threshold and/or the channel condition is less or equal to the second channel condition threshold.

In certain such examples, when the UE 404 determines that the UE is a low-mobility device, then the UE 404 may skip updating the wideband component $W_1$ (e.g., may reuse the first wideband component $W_1$). In some examples, when the UE 404 determines that the UE is a high-mobility device, then the UE 404 may update the wideband component $W_1$ by selecting a new wideband component $W_1$ from the wideband component codebook. In some examples, when the UE 404 determines that the UE is a medium-mobility device, then the UE 404 may update the wideband component $W_1$ by selecting the new wideband component $W_1$ from a subset of the wideband component codebook. By selecting the second wideband component $W_1$ from the subset of the wideband component codebook (rather than from the full wideband component codebook), the UE 404 is able to reduce the complexity of PMI selection while still performing relatively accurate PMI selection. In some examples, the UE 404 may determine the subset of the wideband component codebook based on, for example, DFT indices associated with angular directions and DFT beams. For example, the UE 404 may determine at time n (e.g., when determining to update the wideband component $W_1$) that a DFT index 5 is the strongest beam. The UE 404 may then determine the subset of the wideband component codebook based on the determined DFT index 5 (e.g., the subset may include {3, 4, 5, 6, 7}).

While the above-described example describes three example classifications for the UE (e.g., a low-mobility UE, a medium-mobility UE, and a high-mobility UE), it should be appreciated that in other examples, any suitable quantity of classifications may be used. In certain such examples, the different mobility thresholds, the different channel condition thresholds, and/or the different subsets of the wideband component codebook may vary based on the corresponding classifications for the UE.

It should be appreciated that in different examples, any quantity and/or combination of properties may be used for determining whether to update the wideband component $W_1$ and/or to reuse the previous wideband component $W_1$ (e.g., from the first PMI) for the second wideband component $W_1$.

Figure 5:
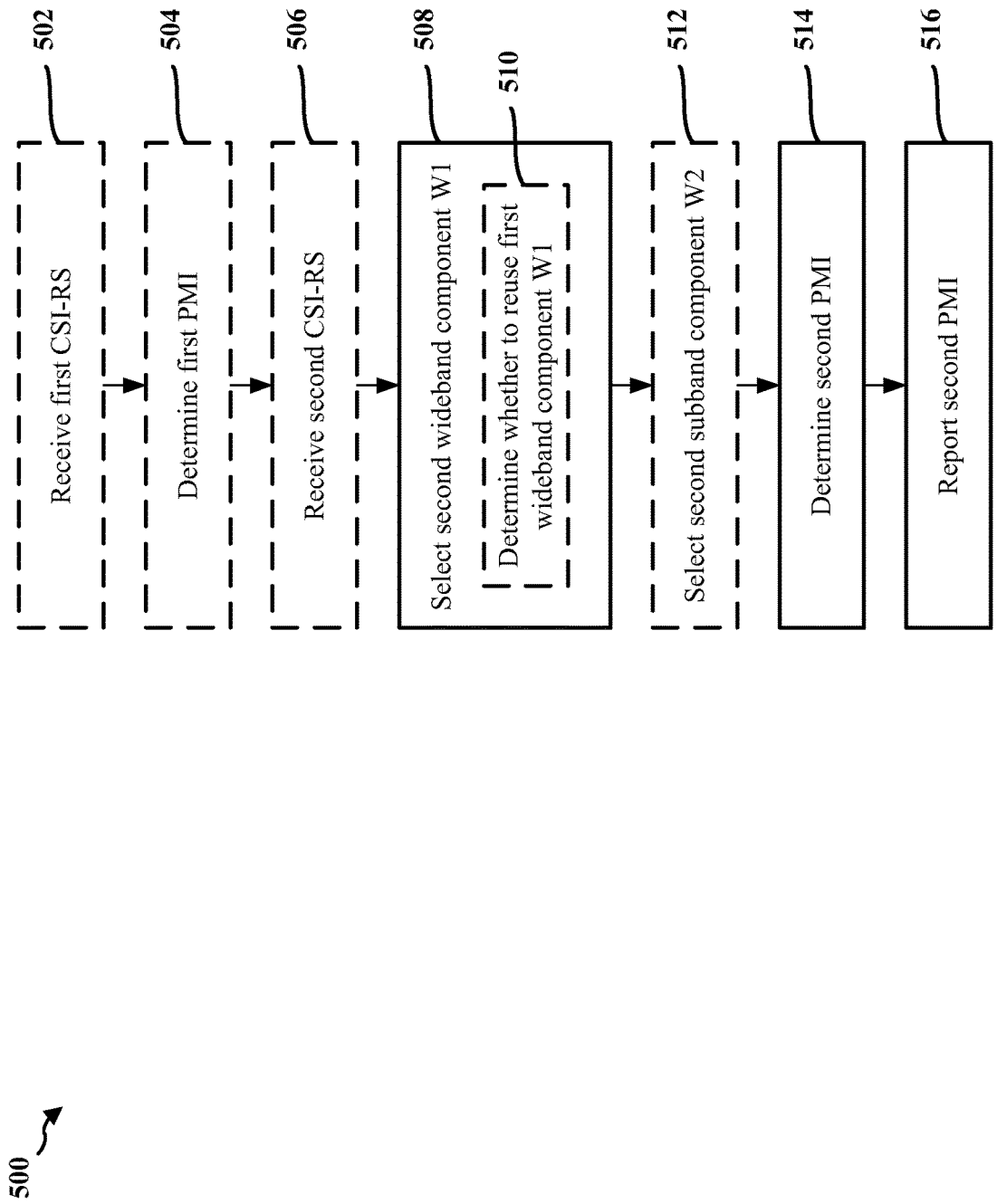
FIGS. 5 and 6 are flowcharts of example methods of wireless communication at a UE.
Figure 6:
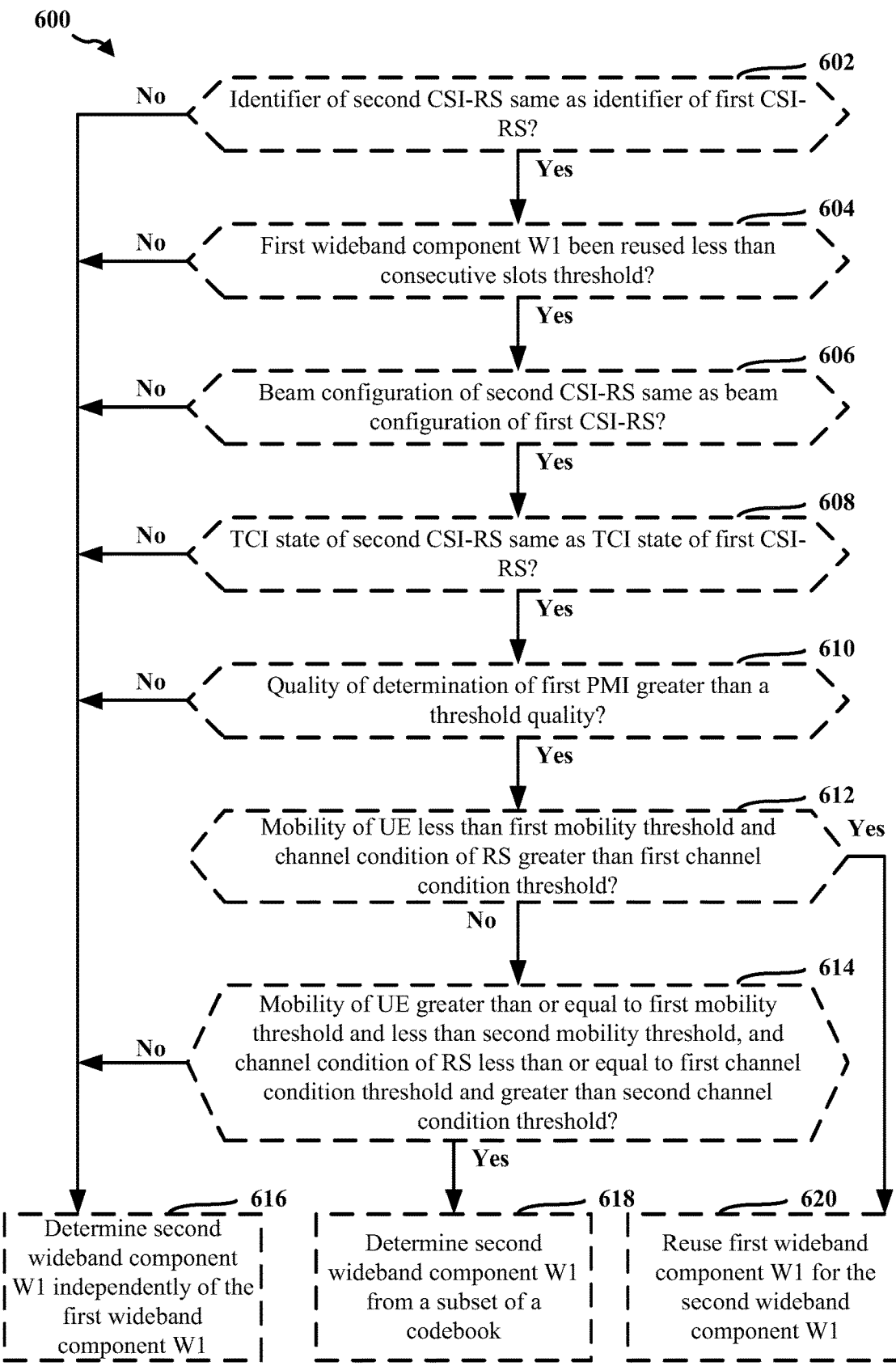

FIG. 5 is a flowchart 500 of a method of wireless communication. FIG. 6 is a flowchart 600 of another method of wireless communication. The methods 500 and/or 600 may be performed by a UE (e.g., the UE 104, the UE 350, the UE 404, the apparatus 702/702', and/or the processing system 814, which may include the memory 360 and which may be the entire UE 350 or a component of the UE 350, such as the TX processor 368, the RX processor 356, and/or the controller/processor 359). Optional aspects are illustrated with a dashed line.

The flowchart 500 of FIG. 5 is a method of wireless communication that facilitates improving performance of channel state feedback via dynamically determining to update and/or skip precoder selection in the channel state feedback process and resulting in increased power/cycle savings.

At 502, the UE may receive a first CSI-RS from a base station, as described in connection with, for example, the CSI-RS 410 of FIG. 4. For example, a reception component 704 of apparatus 702 may facilitate the receiving of the first CSI-RS.

At 504, the UE may determine a first PMI based on the first CSI-RS, a first wideband component $W_1$, and a first subband component $W_2$, as described in connection with, for example, the determining of the first PMI at 420 of FIG. 4. For example, PMI determining component 724 may facilitate the determining of the first PMI.

At 506, the UE may receive a second CSI-RS from the base station, as described in connection with, for example, the CSI-RS 440 of FIG. 4. For example, the reception component 704 may facilitate the receiving of the second CSI-RS.

At 508, the UE may select a second wideband component $W_1$ of a second PMI, as described in connection with, for example, the determining of the wideband component $W_1$ at 450 of FIG. 4. For example, $W_1$ selection component 706 may facilitate the selecting of the second wideband component $W_1$. In some examples, the UE may determine whether to reuse the first wideband component $W_1$ for the second wideband component $W_1$, to select the second wideband component $W_1$ from a codebook (e.g., by determining the second wideband component $W_1$ independently of the first wideband component $W_1$), and/or to determine the second wideband component $W_1$ from a subset of the codebook.

In some examples, at 510, the UE may determine whether to reuse the first wideband component $W_1$ of the first PMI for the second wideband component $W_1$. For example, the $W_1$ selection component 706 may facilitate the determining of whether to reuse the first wideband component $W_1$. In some examples, the UE may determine whether to reuse the first wideband component $W_1$ based on at least one of (1) whether an identifier (ID) of the second CSI-RS 440 is the same as an ID of the first CSI-RS 410, (2) whether the first wideband component $W_1$ has been reused over a threshold number of consecutive slots, (3) whether a beam configuration of the second CSI-RS 440 is the same as a beam configuration of the first CSI-RS 410, (4) whether a TCI state of the second CSI-RS 440 is the same as a TCI state of the first CSI-RS 410, (5) whether a quality of the determination of the first PMI is greater than a threshold quality, or (6) whether a mobility of the UE is less than a first mobility threshold and a channel condition of reference signals received at the UE is greater than a first channel condition threshold.

For example, the UE may determine to reuse the first wideband component $W_1$ when one or more of the following conditions are satisfied: (1) the ID of the second CSI-RS 440 is the same as the ID of the first CSI-RS 410, (2) the first wideband component $W_1$ has been reused less than the threshold number of consecutive slots, (3) the beam configuration of the second CSI-RS 440 is the same as the beam configuration of the first CSI-RS 410, (4) the TCI state of the second CSI-RS 440 is the same as the TCI state of the first CSI-RS 410, (5) the quality of the determination of the first PMI is greater than the threshold quality, and (6) the mobility of the UE is less than the first mobility threshold and the channel condition of the reference signals received at the UE is greater than the first channel condition threshold. Example techniques for determining whether to reuse the first wideband component $W_1$ are also described below in connection with the flowchart 600 of FIG. 6.

At 512, the UE may select a second subband component $W_2$ of the second PMI, as described in connection with the determining of the second subband component $W_2$ at 460 of FIG. 4. For example, $W_2$ selection component 722 may facilitate the selecting of the second subband component $W_2$.

At 514, the UE may determine the second PMI based on the second CSI-RS 440, the second wideband component $W_1$, and the second subband component $W_2$, as described in connection with the determining of the second PMI at 470 of FIG. 4. For example, the PMI determining component 724 may facilitate the determining of the second PMI.

At 516, the UE may report the second PMI to the base station, as described in connection with the transmitting of the second CSI report 480 of FIG. 4. For example, transmission component 726 may facilitate the reporting of the second PMI.

The flowchart 600 of FIG. 6 is a method of wireless communication that facilitates improving performance of channel state feedback via dynamically determining to update a precoder selection and/or to reuse a precoder selection in the channel state feedback process and resulting in increased power/cycle savings. In some examples, the flowchart 600 of FIG. 6 may be used to implement 508 of FIG. 5 to select the second wideband component $W_1$ and/or 510 to determine whether to reuse a first wideband component $W_1$.

Although the example flowchart 600 includes a series of tests of different conditions, it should be appreciated that the selecting of the second wideband component $W_1$ and/or the determining of whether to reuse the first wideband component $W_1$ may be based on any suitable quantity of conditions. Furthermore, it should be appreciated that in additional or alternative examples, the ordering of the tests of the different conditions included in the flowchart 600 may be in any suitable order and/or may include any suitable subset of the tests of different conditions.

At 602, the UE may determine whether an identifier of a second CSI-RS is the same as an identifier of a first CSI-RS. For example, ID handling component 708 apparatus 702 may facilitate the determining of the identifier of the second CSI-RS and/or the comparing of the identifier of the second CSI-RS to the identifier of the first CSI-RS. If, at 602, the UE determined that the identifier of the second CSI-RS was not the same as the identifier of the first CSI-RS, then control proceeds to 616 to determine the second wideband component $W_1$ independently of the first wideband component $W_1$.

If, at 602, the UE determined that the identifier of the second CSI-RS was the same the identifier of the first CSI-RS, then, at 604, the UE may determine whether the first wideband component $W_1$ has been reused less than a consecutive slots threshold. For example, reuse counting component 710 may facilitate the determining of the quantity of reuses of the first wideband component $W_1$ and/or the comparing of the quantity of reuses to the consecutive slots threshold. If, at 604, the UE determined that the first wideband component $W_1$ has not been reused less than the consecutive slots threshold (e.g., the first wideband component $W_1$ was used a quantity that is the consecutive slots threshold), then control proceeds to 616 to determine the second wideband component $W_1$ independently of the first wideband component $W_1$.

If, at 604, the UE determined that the first wideband component $W_1$ has been reused less than the consecutive slots threshold, then, at 606, the UE may determine whether a beam configuration of the second CSI-RS is the same as a beam configuration of the first CSI-RS. For example, beam configuration component 712 may facilitate the determining of the beam configuration of the second CSI-RS and/or the comparing of the beam configuration of the second CSI-RS to the beam configuration of the first CSI-RS. If, at 606, the UE determined that the beam configuration of the second CSI-RS was not the same the beam configuration of the first CSI-RS, then control proceeds to 616 to determine the second wideband component $W_1$ independently of the first wideband component $W_1$.

If, at 606, the UE determined that the beam configuration of the second CSI-RS was the same as the beam configuration of the first CSI-RS, then, at 608, the UE may determine whether a TCI state of the second CSI-RS is the same as a TCI state of the first CSI-RS. For example, TCI state component 714 may facilitate the determining of the TCI state of the second CSI-RS and/or the comparing of the TCI state of the second CSI-RS to the TCI state of the first CSI-RS. If, at 608, the UE determined that the TCI state of the second CSI-RS was not the same as the TCI state of the first CSI-RS, then control proceeds to 616 to determine the second wideband component $W_1$ independently of the first wideband component $W_1$.

If, at 608, the UE determined that the TCI state of the second CSI-RS was the same as the TCI state of the first CSI-RS, then, at 610, the UE may determine whether a quality of a determination of the first PMI is greater than a threshold quality. For example, PMI quality component 716 may facilitate the determining of the quality of the determination of the first PMI and/or the comparing of the quality of the determination to the threshold quality. If, at 610, the UE determined that the quality of the determination of the first PMI did not satisfy the threshold quality (e.g., was less than or equal to the threshold quality), then control proceeds to 616 to determine the second wideband component $W_1$ independently of the first wideband component $W_1$.

If, at 610, the UE determined that the quality of the determination of the first PMI satisfied the threshold quality, then, at 612, the UE may determine whether a mobility of the UE is less than a first mobility threshold and a channel condition of reference signals received at the UE is greater than a first channel condition threshold. For example, mobility component 718 may facilitate the determining of the mobility of the UE and/or the comparing of the mobility to the first mobility threshold, and channel condition component 720 may facilitate the determining of the channel condition of the reference signals received at the UE and/or the comparing of the channel condition to the first channel condition threshold. If, at 612, the UE determined that the mobility of the UE satisfied the first mobility threshold and the channel condition of the reference signals received at the UE satisfied the first channel condition threshold, then control proceeds to 620 to facilitate reusing the first wideband component $W_1$ for the second wideband component $W_1$.

If, at 612, the UE determined that the mobility of the UE did not satisfy the first mobility threshold (e.g., the mobility of the UE was greater than or equal to the first mobility threshold) and/or the UE determined that the channel condition of reference signals received at the UE did not satisfy the first channel condition threshold (e.g., the channel condition of reference signals received at the UE was less than or equal to the first channel condition threshold), then, at 614, the UE may determine whether the mobility of the UE is greater than or equal to the first mobility threshold and less than a second mobility threshold and the UE may determine whether channel condition of reference signals received at the UE is less than or equal to the first channel condition threshold and greater than a second channel condition threshold. For example, the mobility component 718 may facilitate the determining of the mobility of the UE and/or the comparing of the mobility of the UE to the first mobility threshold and the second mobility threshold, and the channel condition component 720 may facilitate the determining of the channel condition and/or the comparing of the channel condition to the first channel condition threshold and the second channel condition threshold.

If, at 614, the UE determined that the mobility of the UE did not satisfy the second mobility threshold (e.g., the mobility of the UE was greater than or equal to the second threshold) and/or the UE determined that the channel condition of reference signals received at the UE did not satisfy the second channel condition threshold (e.g., the channel condition of reference signals was less than or equal to the second channel condition threshold), then control proceeds to 616 to determine the second wideband component $W_1$ independently of the first wideband component $W_1$.

If, at 614, the UE determined that the mobility of the UE satisfied the second mobility threshold (e.g., the mobility of the UE was greater than or equal to the first mobility threshold and less than the second mobility threshold) and that the channel condition of reference signals received at the UE satisfied the second channel condition threshold (e.g., the channel condition of reference signals was less than or equal to the first channel condition threshold and greater than the second channel condition threshold), then control proceeds to 618 to determine the second wideband component $W_1$ from a subset of a codebook.

At 616, the UE may determine the second wideband component $W_1$ independently of the first wideband component $W_1$. For example, $W_1$ selection component 706 may facilitate the determining of the second wideband component $W_1$ independently of the first wideband component $W_1$. In some examples, the UE may determine the second wideband component $W_1$ independently of the first wideband component $W_1$ by selecting the second wideband component $W_1$ from a wideband component codebook.

At 618, the UE may determine the second wideband component $W_1$ by selecting the second wideband component $W_1$ from a subset of the wideband component codebook. For example, the $W_1$ selection component 706 may facilitate the selecting of the second wideband component $W_1$ from the subset of the wideband component codebook.

At 620, the UE may reuse the first wideband component $W_1$ for the second wideband component $W_1$. For example, the $W_1$ selection component 706 may facilitate the selecting of the first wideband component $W_1$ for the second wideband component $W_1$. In some examples, the UE may update the quantity of reuses of the first wideband component $W_1$ based on the reusing of the first wideband component $W_1$ for the second wideband component $W_1$.

Figure 7:
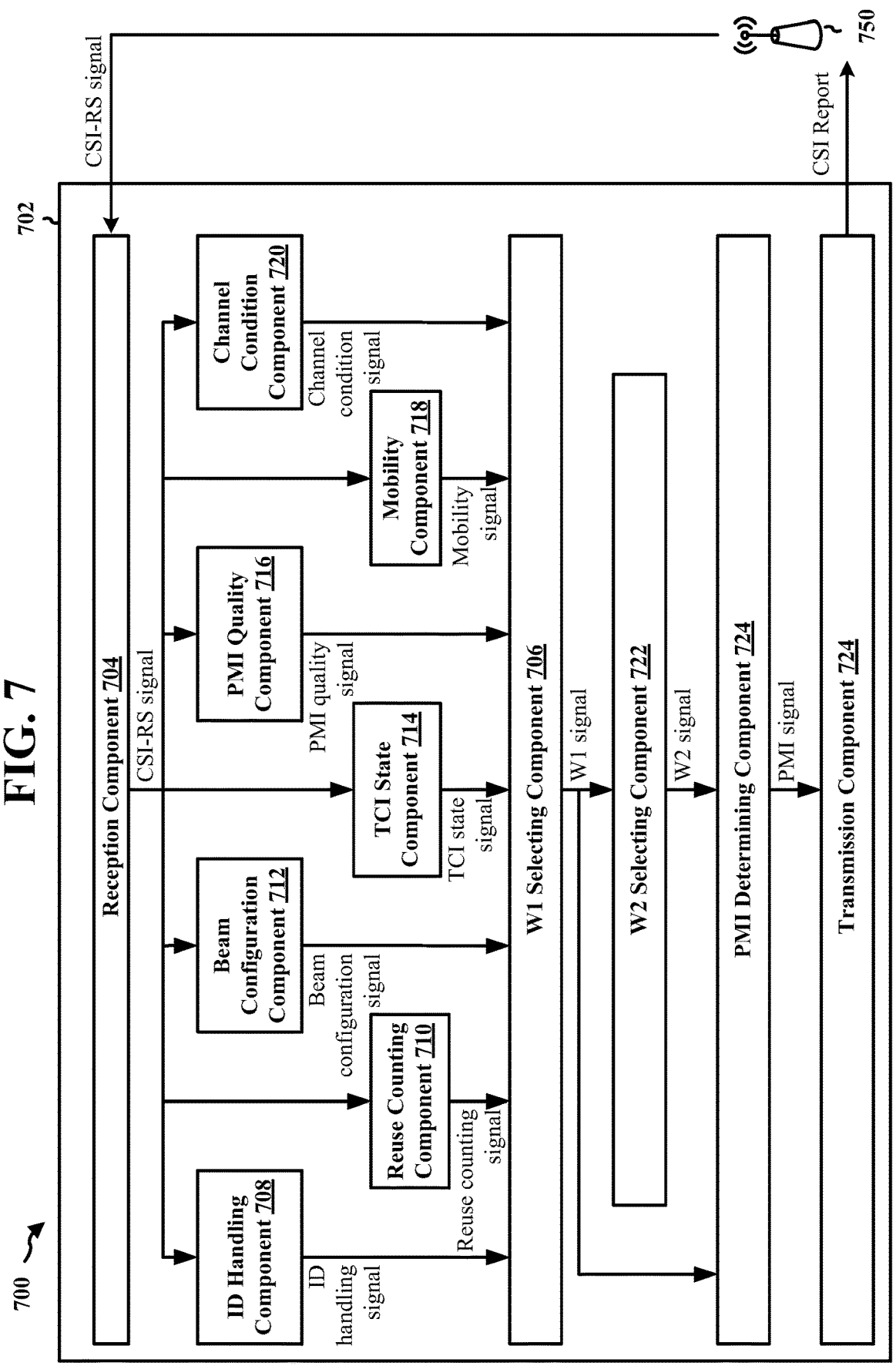
FIG. 7 is a conceptual data flow diagram illustrating the data flow between different means/components in an example apparatus.

FIG. 7 is a conceptual data flow diagram 700 illustrating the data flow between different means/components in an example apparatus 702 in communication with a base station 750. The apparatus 702 may be a UE. The apparatus 702 may perform the methods of flowcharts 500 and/or 600. The apparatus 702 includes a reception component 704, a $W_1$ selection component 706, an ID handling component 708, a reuse counting component 710, a beam configuration component 712, a TCI state component 714, a PMI quality component 716, a mobility component 718, a channel condition component 720, a $W_2$ selection component 722, a PMI determining component 724, and a transmission component 726. The base station 750 may include the same or similar components as shown with respect to the base station 102/180 of FIG. 1, the base station 310 of FIG. 3, and/or the base station 402 of FIG. 4.

The reception component 704 may be configured to receive various types of signals/messages and/or other information from other devices, including, for example, the base station 750. The messages/information may be received via the reception component 704 and provided to one or more components of the apparatus 702 for further processing and use in performing various operations. For example, the reception component 704 may be configured to receive signaling including, for example, a first CSI-RS and/or a second CSI-RS (e.g., as described in connection with 502 and/or 506).

The $W_1$ selection component 706 may be configured to select a wideband component $W_1$ of a PMI (e.g., as described in connection with 508). In some examples, the $W_1$ selection component 706 may select the wideband component $W_1$ based on, for example, a determination on whether to reuse a wideband component $W_1$ from a previous PMI (e.g., as described in connection with 616), a determination to select the wideband component $W_1$ from a subset of a codebook (e.g., as described in connection with 618), and/or a determination to select the wideband component $W_1$ from the codebook (e.g., as described in connection with 620).

The ID handling component 708 may be configured to determine whether an ID of a second CSI-RS is the same as an ID of a first CSI-RS (e.g., as described in connection with 602).

The reuse counting component 710 may be configured to determine whether a first wideband component $W_1$ has been reused over a threshold number of consecutive slots (e.g., as described in connection with 604).

The beam configuration component 712 may be configured to determine whether a beam configuration of a second CSI-RS is the same as a beam configuration of a first CSI-RS (e.g., as described in connection with 606).

The TCI state component 714 may be configured to determine whether a TCI state of a second CSI-RS is the same as a TCI state of a first CSI-RS (e.g., as described in connection with 608).

The PMI quality component 716 may be configured to determine whether a quality of a determination of a first PMI is greater than a threshold quality (e.g., as described in connection with 610).

The mobility component 718 may be configured to determine whether a mobility of the apparatus 702 is less than a first mobility threshold and/or to determine whether the mobility of the apparatus 702 is greater than or equal to the first mobility threshold and less than a second mobility threshold (e.g., as described in connection with 612 and/or 614).

The channel condition component 720 may be configured to determine whether a channel condition of reference signals received at the apparatus 702 is greater than a first channel condition threshold and/or to determine whether the channel condition of reference signals received at the apparatus 702 is less than or equal to the first channel condition threshold and greater than a second channel condition threshold (e.g., as described in connection with 612 and/or 614).

The $W_2$ selection component 722 may be configured to select a subband component $W_2$ based on a wideband component $W_1$ and a CSI-RS (e.g., as described in connection with 512).

The PMI determining component 724 may be configured to determine a PMI based on a wideband component $W_1$ and a subband component $W_2$ (e.g., as described in connection with 504 and/or 514).

The transmission component 726 may be configured to transmit various types of signals/messages and/or other information to other devices, including, for example, the base station 750. For example, the transmission component 726 may be configured to transmit uplink communications, such as a CSI report and/or a PMI signal, to the base station 750 (e.g., as described in connection with 516).

The apparatus may include additional components that perform each of the blocks of the algorithm in the aforementioned flowcharts of FIGS. 5 and/or 6. As such, each block in the aforementioned flowcharts of FIGS. 5 and/or 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
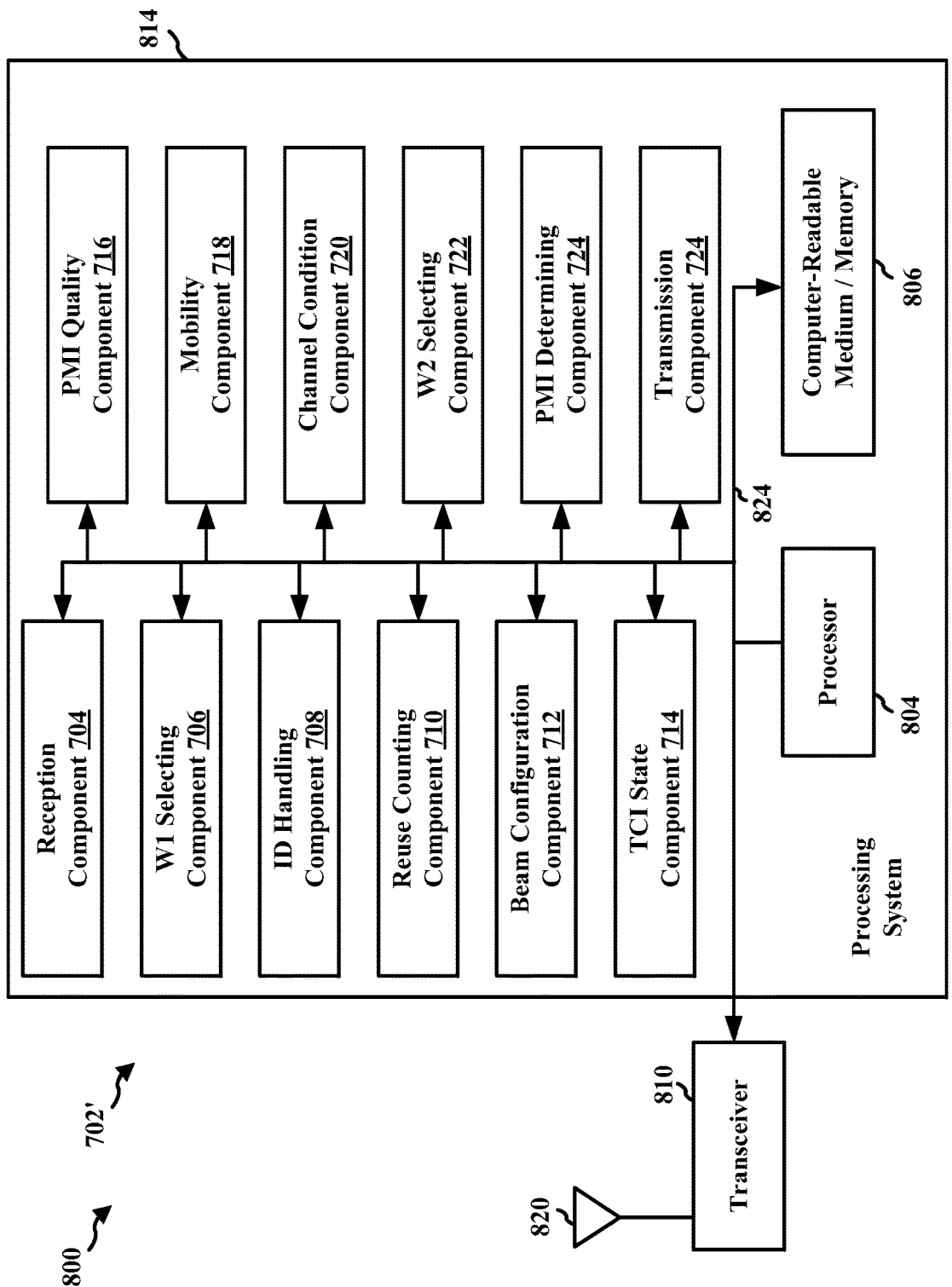
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718, 720, 722, 724, 726, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 726, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718, 720, 722, 724, 726. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and/or the controller/processor 359. Alternatively, the processing system 814 may be the entire UE (e.g., see the UE 350 of FIG. 3).

In one configuration, the apparatus 702/702' for wireless communication includes means for selecting, at a UE, a second wideband component $W_1$ of a second PMI, the second PMI to include the second wideband component $W_1$ and a second subband component $W_2$, and the means for selecting the second wideband component $W_1$ being based at least on a determining of whether to reuse for the second wideband component $W_1$ a first wideband component $W_1$ of a first PMI previously determined based on a received first CSI-RS, the first PMI to include a first wideband component $W_1$ and a first subband component $W_2$, means for determining the second PMI based on a received second CSI-RS, the second wideband component $W_1$, and the second subband component $W_2$, and means for reporting the determined second PMI to a base station. In another configuration, the apparatus 702/702' may include means for receiving, from the base station, the first CSI-RS, means for determining the first PMI based on the received first CSI-RS, and means for receiving, from the base station, the second CSI-RS. In another configuration, the apparatus 702/702' may include means for determining whether to reuse the first wideband component $W_1$ for the second wideband component $W_1$ based on at least one of (1) whether an ID of the second CSI-RS is the same as an ID of the first CSI-RS, (2) whether the first wideband component $W_1$ has been reused over a threshold number of consecutive slots, (3) whether a beam configuration of the second CSI-RS is the same as a beam configuration of the first CSI-RS, (4) whether a TCI state of the second CSI-RS is the same as a TCI state of the first CSI-RS, (5) whether a quality of the determination of the first PMI is greater than a threshold quality, or (6) whether a mobility of the UE is less than a first mobility threshold and a channel condition of reference signals received at the UE is greater than a first channel condition threshold. In another configuration, the apparatus 702/702' may include means for determining the second wideband component $W_1$ independently of the first wideband component $W_1$ when the ID of the second CSI-RS is different than the ID of the first CSI-RS. In another configuration, the apparatus 702/702' may include means for determining the second wideband component $W_1$ independently of the first wideband component $W_1$ when the first wideband component $W_1$ has been reused the threshold number of consecutive slots. In another configuration, the apparatus 702/702' may include means for determining the second wideband component $W_1$ independently of the first wideband component $W_1$ when the beam configuration of the second CSI-RS is different than the beam configuration of the first CSI-RS. In another configuration, the apparatus 702/702' may include means for determining the second wideband component $W_1$ independently of the first wideband component $W_1$ when the TCI state of the second CSI-RS is different than the TCI state of the first CSI-RS. In another configuration, the apparatus 702/702' may include means for determining the second wideband component $W_1$ independently of the first wideband component $W_1$ when the quality of the determination of the first PMI is less than or equal to the threshold quality. In another configuration, the apparatus 702/702' may include means for determining the second wideband component $W_1$ independently of the first wideband component $W_1$ when the mobility of the UE is greater than or equal to the first mobility threshold or the channel condition of the reference signals received at the UE is less than or equal to the first channel condition threshold. In another configuration, the apparatus 702/702' may include means for determining the second wideband component $W_1$ from a subset of a codebook when the mobility of the UE is less than a second mobility threshold but greater than or equal to the first mobility threshold and the channel condition of the reference signals received at the UE is greater than a second channel condition threshold but less than or equal to the first channel condition threshold, and means for determining the second wideband component $W_1$ from the codebook when the mobility of the UE is greater than the second mobility threshold or the channel condition of the reference signals received at the UE is less than the second channel condition threshold. In another configuration, the apparatus 702/702' may include means for determining to reuse the first wideband component $W_1$ when one or more of the following conditions are satisfied: (1) the ID of the second CSI-RS is the same as the ID of the first CSI-RS, (2) the first wideband component $W_1$ has been reused less than the threshold number of consecutive slots, (3) the beam configuration of the second CSI-RS is the same as the beam configuration of the first CSI-RS, (4) the TCI state of the second CSI-RS is the same as the TCI state of the first CSI-RS, (5) the quality of the determination of the first PMI is greater than the threshold quality, and (6) the mobility of the UE is less than the first mobility threshold and the channel condition of the reference signals received at the UE is greater than the first channel condition threshold. In another configuration, the apparatus 702/702' may include means for selecting the second subband component $W_2$ based on the second wideband component $W_1$ and the second CSI-RS. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and/or the controller/processor 359. As such, in one configuration, the aforementioned means may be the TX Processor 368, the RX Processor 356, and/or the controller/processor 359 configured to perform the functions recited by the aforementioned means.

Example techniques disclosed herein facilitate adaptive precoder updating for channel state feedback. For example, techniques disclosed herein facilitate determining whether to reuse a first wideband component $W_1$ of a first PMI for a second wideband component $W_1$, whether to select the second wideband component $W_1$ from a wideband component codebook, and/or whether to select the second wideband component $W_1$ from a subset of the wideband component codebook. In some examples, the determining of whether to reuse the first wideband component $W_1$ for the second wideband component $W_1$ may be based on one or more conditions associated with a first CSI-RS associated with the first wideband component $W_1$ and a second CSI-RS. For example, the determining of whether to reuse the first wideband component $W_1$ may be based on identifiers associated with the first CSI-RS and the second CSI-RS, a quantity of reuses of the first wideband component $W_1$, beam configurations of the first CSI-RS and the second CSI-RS, TCI states of the first CSI-RS and the second CSI-RS, a quality of the determination of the first PMI, a mobility of the UE, and/or a channel condition of reference signals received at the UE. By dynamically determining whether to reuse the first wideband component $W_1$, techniques disclosed herein may increase power/cycle savings without introducing performance degradation.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    selecting a second wideband component $W_1$ of a second precoding matrix indicator (PMI), the second PMI comprising the second wideband component $W_1$ and a second subband component $W_2$, wherein the selecting of the second wideband component $W_1$ is based at least on a determining of whether to reuse for the second wideband component $W_1$ a first wideband component $W_1$ of a first PMI previously determined based on received first channel state information reference signals (CSI-RS), wherein the first PMI comprises a first wideband component $W_1$ and a first subband component $W_2$;
    determining the second PMI based on a received second CSI-RS, the second wideband component $W_1$, and the second subband component $W_2$; and
    reporting the determined second PMI to a base station.

2. The method of claim 1, further comprising:
    receiving, from the base station, the first CSI-RS;
    determining the first PMI based on the received first CSI-RS; and
    receiving, from the base station, the second CSI-RS.

3. The method of claim 1, wherein the determining of whether to reuse the first wideband component $W_1$ for the second wideband component $W_1$ is based on at least one of (1) whether an identifier (ID) of the second CSI-RS is the same as an ID of the first CSI-RS, (2) whether the first wideband component $W_1$ has been reused over a threshold number of consecutive slots, (3) whether a beam configuration of the second CSI-RS is the same as a beam configuration of the first CSI-RS, (4) whether a transmission configuration indication (TCI) state of the second CSI-RS is the same as a TCI state of the first CSI-RS, (5) whether a quality of the determination of the first PMI is greater than a threshold quality, or (6) whether a mobility of the UE is less than a first mobility threshold and a channel condition of reference signals received at the UE is greater than a first channel condition threshold.

4. The method of claim 3, wherein the selecting of the second wideband component $W_1$ includes determining the second wideband component $W_1$ independently of the first wideband component $W_1$ when the ID of the second CSI-RS is different than the ID of the first CSI-RS.

5. The method of claim 3, wherein the selecting of the second wideband component $W_1$ includes determining the second wideband component $W_1$ independently of the first wideband component $W_1$ when the first wideband component $W_1$ has been reused the threshold number of consecutive slots.

6. The method of claim 3, wherein the selecting of the second wideband component $W_1$ includes determining the second wideband component $W_1$ independently of the first wideband component $W_1$ when the beam configuration of the second CSI-RS is different than the beam configuration of the first CSI-RS.

7. The method of claim 3, wherein the selecting of the second wideband component $W_1$ includes determining the second wideband component $W_1$ independently of the first wideband component $W_1$ when the TCI state of the second CSI-RS is different than the TCI state of the first CSI-RS.

8. The method of claim 3, wherein the selecting of the second wideband component $W_1$ includes determining the second wideband component $W_1$ independently of the first wideband component $W_1$ when the quality of the determination of the first PMI is less than or equal to the threshold quality.

9. The method of claim 3, wherein the selecting of the second wideband component $W_1$ includes determining the second wideband component $W_1$ independently of the first wideband component $W_1$ when the mobility of the UE is greater than or equal to the first mobility threshold or the channel condition of the reference signals received at the UE is less than or equal to the first channel condition threshold.

10. The method of claim 9, wherein the selecting of the second wideband component $W_1$ includes:
    determining the second wideband component $W_1$ from a subset of a codebook when the mobility of the UE is less than a second mobility threshold but greater than or equal to the first mobility threshold and the channel condition of the reference signals received at the UE is greater than a second channel condition threshold but less than or equal to the first channel condition threshold; and
    determining the second wideband component $W_1$ from the codebook when the mobility of the UE is greater than the second mobility threshold or the channel condition of the reference signals received at the UE is less than the second channel condition threshold.

11. The method of claim 3, wherein the selecting of the second wideband component $W_1$ includes determining to reuse the first wideband component $W_1$ when one or more of the following conditions are satisfied: (1) the ID of the second CSI-RS is the same as the ID of the first CSI-RS, (2) the first wideband component $W_1$ has been reused less than the threshold number of consecutive slots, (3) the beam configuration of the second CSI-RS is the same as the beam configuration of the first CSI-RS, (4) the TCI state of the second CSI-RS is the same as the TCI state of the first CSI-RS, (5) the quality of the determination of the first PMI is greater than the threshold quality, and (6) the mobility of the UE is less than the first mobility threshold and the channel condition of the reference signals received at the UE is greater than the first channel condition threshold.

12. The method of claim 1, wherein the determining of the second PMI further includes selecting the second subband component $W_2$ based on the second wideband component $W_1$ and the second CSI-RS.

13. An apparatus of wireless communication, comprising:
    means for selecting, at a user equipment (UE), a second wideband component $W_1$ of a second precoding matrix indicator (PMI), the second PMI comprising the second wideband component $W_1$ and a second subband component $W_2$, wherein the selecting of the second wideband component $W_1$ is based at least on a determining of whether to reuse for the second wideband component $W_1$ a first wideband component $W_1$ of a first PMI previously determined based on received first channel state information reference signals (CSI-RS), wherein the first PMI comprises a first wideband component $W_1$ and a first subband component $W_2$;
    means for determining the second PMI based on a received second CSI-RS, the second wideband component $W_1$, and the second subband component $W_2$; and
    means for reporting the determined second PMI to a base station.

14. The apparatus of claim 13, further comprising:
    means for receiving, from the base station, the first CSI-RS;
    means for determining the first PMI based on the received first CSI-RS; and means for receiving, from the base station, the second CSI-RS.

15. The apparatus of claim 13, wherein the means for determining whether to reuse the first wideband component $W_1$ for the second wideband component $W_1$ is based on at least one of (1) whether an identifier (ID) of the second CSI-RS is the same as an ID of the first CSI-RS, (2) whether the first wideband component $W_1$ has been reused over a threshold number of consecutive slots, (3) whether a beam configuration of the second CSI-RS is the same as a beam configuration of the first CSI-RS, (4) whether a transmission configuration indication (TCI) state of the second CSI-RS is the same as a TCI state of the first CSI-RS, (5) whether a quality of the determination of the first PMI is greater than a threshold quality, or (6) whether a mobility of the UE is less than a first mobility threshold and a channel condition of reference signals received at the UE is greater than a first channel condition threshold.

16. The apparatus of claim 15, further comprising means for determining the second wideband component $W_1$ independently of the first wideband component $W_1$ when the ID of the second CSI-RS is different than the ID of the first CSI-RS.

17. The apparatus of claim 15, further comprising means for determining the second wideband component $W_1$ independently of the first wideband component $W_1$ when the first wideband component $W_1$ has been reused the threshold number of consecutive slots.

18. The apparatus of claim 15, further comprising means for determining the second wideband component $W_1$ independently of the first wideband component $W_1$ when the beam configuration of the second CSI-RS is different than the beam configuration of the first CSI-RS.

19. The apparatus of claim 15, further comprising means for determining the second wideband component $W_1$ independently of the first wideband component $W_1$ when the TCI state of the second CSI-RS is different than the TCI state of the first CSI-RS.

20. The apparatus of claim 15, further comprising means for determining the second wideband component $W_1$ independently of the first wideband component $W_1$ when the quality of the determination of the first PMI is less than or equal to the threshold quality.

21. The apparatus of claim 15, further comprising means for determining the second wideband component $W_1$ independently of the first wideband component $W_1$ when the mobility of the UE is greater than or equal to the first mobility threshold or the channel condition of the reference signals received at the UE is less than or equal to the first channel condition threshold.

22. The apparatus of claim 21, further comprising:
means for determining the second wideband component $W_1$ from a subset of a codebook when the mobility of the UE is less than a second mobility threshold but greater than or equal to the first mobility threshold and the channel condition of the reference signals received at the UE is greater than a second channel condition threshold but less than or equal to the first channel condition threshold; and
means for determining the second wideband component $W_1$ from the codebook when the mobility of the UE is greater than the second mobility threshold or the channel condition of the reference signals received at the UE is less than the second channel condition threshold.

23. The apparatus of claim 15, further comprising means for determining to reuse the first wideband component $W_1$ when one or more of the following conditions are satisfied:
(1) the ID of the second CSI-RS is the same as the ID of the first CSI-RS, (2) the first wideband component $W_1$ has been reused less than the threshold number of consecutive slots, (3) the beam configuration of the second CSI-RS is the same as the beam configuration of the first CSI-RS, (4) the TCI state of the second CSI-RS is the same as the TCI state of the first CSI-RS, (5) the quality of the determination of the first PMI is greater than the threshold quality, and (6) the mobility of the UE is less than the first mobility threshold and the channel condition of the reference signals received at the UE is greater than the first channel condition threshold.

24. The apparatus of claim 13, further comprising means for selecting the second subband component $W_2$ based on the second wideband component $W_1$ and the second CSI-RS.

25. An apparatus of wireless communication, comprising:
a memory; and
at least one processor coupled to the memory and configured to:
select, at a user equipment (UE), a second wideband component $W_1$ of a second precoding matrix indicator (PMI), the second PMI comprising the second wideband component $W_1$ and a second subband component $W_2$, wherein the selecting of the second wideband component $W_1$ is based at least on a determining of whether to reuse for the second wideband component $W_1$ a first wideband component $W_1$ of a first PMI previously determined based on received first channel state information reference signals (CSI-RS), wherein the first PMI comprises a first wideband component $W_1$ and a first subband component $W_2$;
determine the second PMI based on a received second CSI-RS, the second wideband component $W_1$, and the second subband component Wz; and
report the determined second PMI to a base station.

26. The apparatus of claim 25, wherein the at least one processor is further configured to:
receive, from the base station, the first CSI-RS;
determine the first PMI based on the received first CSI-RS; and
receive, from the base station, the second CSI-RS.

27. The apparatus of claim 25, wherein the at least one processor is further configured to determine to reuse the first wideband component $W_1$ for the second wideband component $W_1$ based on at least one of (1) whether an identifier (ID) of the second CSI-RS is the same as an ID of the first CSI-RS, (2) whether the first wideband component $W_1$ has been reused over a threshold number of consecutive slots, (3) whether a beam configuration of the second CSI-RS is the same as a beam configuration of the first CSI-RS, (4) whether a transmission configuration indication (TCI) state of the second CSI-RS is the same as a TCI state of the first CSI-RS, (5) whether a quality of the determination of the first PMI is greater than a threshold quality, or (6) whether a mobility of the UE is less than a first mobility threshold and a channel condition of reference signals received at the UE is greater than a first channel condition threshold.

28. The apparatus of claim 27, wherein the at least one processor is further configured to select the second wideband component $W_1$ by determining to reuse the first wideband component $W_1$ when one or more of the following conditions are satisfied: (1) the ID of the second CSI-RS is the same as the ID of the first CSI-RS, (2) the first wideband component $W_1$ has been reused less than the threshold number of consecutive slots, (3) the beam configuration of the second CSI-RS is the same as the beam configuration of the first CSI-RS, (4) the TCI state of the second CSI-RS is the same as the TCI state of the first CSI-RS, (5) the quality of the determination of the first PMI is greater than the threshold quality, and (6) the mobility of the UE is less than the first mobility threshold and the channel condition of the reference signals received at the UE is greater than the first channel condition threshold.

29. The apparatus of claim 25, wherein the at least one processor is further configured to select the second subband component $W_2$ based on the second wideband component $W_1$ and the second CSI-RS.

30. A computer-readable medium storing computer executable code for wireless communication at a User Equipment (UE), comprising code to:
- select a second wideband component $W_1$ of a second precoding matrix indicator (PMI), the second PMI comprising the second wideband component $W_1$ and a second subband component $W_2$, wherein the selecting of the second wideband component $W_1$ is based at least on a determining of whether to reuse for the second wideband component $W_1$ a first wideband component $W_1$ of a first PMI previously determined based on received first channel state information reference signals (CSI-RS), wherein the first PMI comprises a first wideband component $W_1$ and a first subband component $W_2$;
- determine the second PMI based on a received second CSI-RS, the second wideband component $W_1$, and the second subband component $W_2$; and
- report the determined second PMI to a base station.

* * * * *